United States Patent
Onuki

(10) Patent No.: US 11,125,997 B2
(45) Date of Patent: Sep. 21, 2021

(54) INFORMATION PROCESSING APPARATUS, INFORMATION PROCESSING METHOD, AND PROGRAM

(71) Applicant: Sony Interactive Entertainment Inc., Tokyo (JP)

(72) Inventor: Yoshikazu Onuki, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/759,113

(22) PCT Filed: Nov. 5, 2018

(86) PCT No.: PCT/JP2018/041048
§ 371 (c)(1),
(2) Date: Apr. 24, 2020

(87) PCT Pub. No.: WO2019/093278
PCT Pub. Date: May 16, 2019

(65) Prior Publication Data
US 2020/0341274 A1 Oct. 29, 2020

(30) Foreign Application Priority Data
Nov. 10, 2017 (JP) .............................. JP2017-217409

(51) Int. Cl.
*G02B 27/01* (2006.01)
(52) U.S. Cl.
CPC ...... *G02B 27/017* (2013.01); *G02B 2027/014* (2013.01); *G02B 2027/0138* (2013.01)
(58) Field of Classification Search
CPC .................................................. G02B 27/017
See application file for complete search history.

(56) References Cited

U.S. PATENT DOCUMENTS

| 9,873,048 B2 | 1/2018 | Yoshioka | |
| 2015/0103096 A1* | 4/2015 | Gotoda | G02B 27/0179 345/633 |

(Continued)

FOREIGN PATENT DOCUMENTS

| JP | 2008198232 A | 8/2008 |
| JP | 2015082322 A | 4/2015 |

(Continued)

OTHER PUBLICATIONS

International Preliminary Report on Patentability and Written Opinion for corresponding PCT Application No. PCT/JP2018/041048, 17 pages, dated May 22, 2020.

(Continued)

*Primary Examiner* — Kent W Chang
*Assistant Examiner* — Chayce R Bibbee
(74) *Attorney, Agent, or Firm* — Matthew B. Dernier, Esq.

(57) ABSTRACT

An information processing apparatus connected to a display apparatus mounted on a head of a user acquires information regarding a line-of-sight direction of the user and determines a field of view of the user in a virtual three-dimensional space in either a first mode in which the field of view of the user in the virtual three-dimensional space is determined in accordance with the acquired information regarding the line-of-sight information or a second mode in which the field of view of the user in the virtual three-dimensional space is determined without using the information regarding the line-of-sight direction at least in a predetermined direction among the acquired information regarding the line-of-sight direction, and generates an image of an object in the determined field of view to be output.

8 Claims, 6 Drawing Sheets

(56) References Cited

U.S. PATENT DOCUMENTS

| 2017/0111636 A1 | 4/2017 | Hasegawa |
| 2017/0232343 A1 | 8/2017 | Yoshioka |
| 2018/0329215 A1 | 11/2018 | Kake |

FOREIGN PATENT DOCUMENTS

| JP | 2016031439 A | 3/2016 |
| JP | 2017102297 A | 6/2017 |
| JP | 2017140285 A | 8/2017 |
| JP | 2017196312 A | 11/2017 |
| JP | 2018/041048 A1 | 1/2019 |

OTHER PUBLICATIONS

International Search Report for corresponding PCT Application No. PCT/JP2018/041048, 3 pages, dated Jan. 29, 2019.
Notice of Reasons for Refusal for corresponding JP Application No. 2019-552780, 8 pages, dated Jan. 29, 2021.

* cited by examiner

INFORMATION PROCESSING APPARATUS, INFORMATION PROCESSING METHOD, AND PROGRAM

TECHNICAL FIELD

The present invention relates to an information processing apparatus, an information processing method, and a program.

BACKGROUND ART

In recent years, a display apparatus which is worn on a head of a user and presents an image of a virtual space to the user has becoming popular. In such a display apparatus, upon presenting to a user such a display that a field of view of the user moves continuously in a virtual space to be displayed, the user may feel sick (what is generally called VR (Virtual Reality) sickness), in some cases.

To reduce the sickness described above, there has been a countermeasure that moving of the field of view of the user is carried out discontinuously, for example. However, the discontinuous moving impairs a sense of reality, thereby reducing a quality of an experience of the virtual space.

SUMMARY

Technical Problem

There has been demanded an image presenting method capable of reducing a sickness without impairing a sense of reality.

The present invention has been made in view of the above circumstances, and one of objects thereof is to provide an information processing apparatus, an information processing method, and a program which are capable of reducing a sickness without impairing a sense of reality.

Solution to Problem

According to one aspect of the present invention which solves the above-described problem in the existing techniques is an information processing apparatus connected to a display apparatus mounted on a head of a user, including acquiring means configured to acquire information regarding a line-of-sight direction of the user, means configured to acquire information related to an object in a virtual three-dimensional space, field-of-view determining means configured to determine a field of view of the user in the virtual three-dimensional space in either a first mode in which the field of view of the user in the virtual three-dimensional space is determined in accordance with the acquired information regarding the line-of-sight direction or a second mode in which the field of view of the user in the virtual three-dimensional space is determined without using the acquired information regarding the line-of-sight direction at least in a predetermined direction among the acquired information regarding the line-of-sight direction, and generating means configured to generate an image of the object in the determined field of view, in which the generated image is output to display on the display apparatus.

In addition, an information processing method according to one aspect of the present invention uses a computer connected to a display apparatus mounted on a head of a user and includes a step of, by acquiring means, acquiring information regarding a line-of-sight direction of the user, a step of, by information acquiring means, acquiring information related to an object in a virtual three-dimensional space, a step of, by field-of-view determining means, determining a field of view of the user in the virtual three-dimensional space in either a first mode in which the field of view of the user in the virtual three-dimensional space is determined in accordance with the acquired information regarding the line-of-sight direction or a second mode in which the field of view of the user in the virtual three-dimensional space is determined without using the acquired information regarding the line-of-sight direction at least in a predetermined direction among the acquired information regarding the line-of-sight direction, and a step of, by generating means, generating an image of the object in the determined field of view, in which the generated image is output to display on the display apparatus.

Further, a program according to another aspect of the present invention causing a computer connected to a display apparatus mounted on a head of a user to function as: acquiring means configured to acquire information regarding a line-of-sight direction of the user; means configured to acquire information related to an object in a virtual three-dimensional space; field-of-view determining means configured to determine a field of view of the user in the virtual three-dimensional space in either a first mode in which the field of view of the user in the virtual three-dimensional space is determined in accordance with the acquired information regarding the line-of-sight direction or a second mode in which the field of view of the user in the virtual three-dimensional space is determined without using the acquired information regarding the line-of-sight direction at least in a predetermined direction among the acquired information regarding the line-of-sight direction; generating means configured to generate an image of the object in the determined field of view; and means configured to output a generated image to display on the display apparatus.

Advantageous Effect of Invention

According to the present invention, it is possible to reduce sickness without impairing a sense of reality.

DESCRIPTION OF EMBODIMENT

Figure 1:
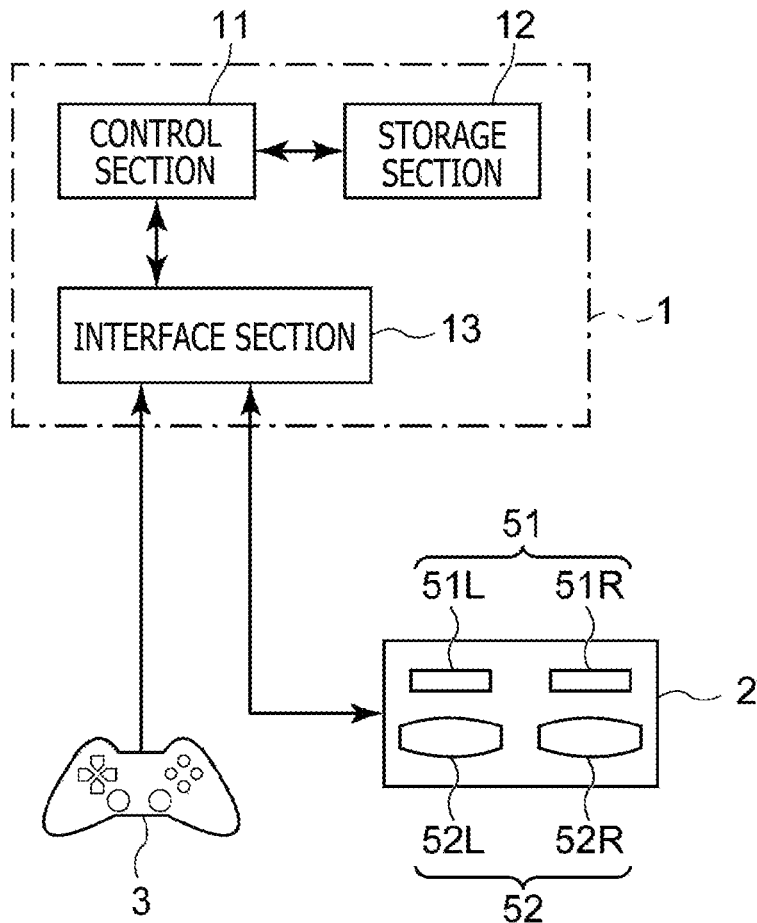
FIG. 1 is a block diagram depicting an example of a configuration and a connection state of an information processing apparatus according to an embodiment of the present invention.

An embodiment of the present invention will be described below with reference to the drawings. An information processing apparatus 1 according to the embodiment of the present invention is an apparatus which supplies image data representing an image to be displayed by a display apparatus 2, and examples of the information processing apparatus 1 include a game console, a handheld gaming device, a personal computer, a smart phone, a tablet, or the like. More specifically, as depicted in FIG. 1, the information processing apparatus 1 is configured in such a way as to be connected to the display apparatus 2 that is worn on a head of a user, an operation device 3, and the like, and to include a control section 11, a storage section 12, and an interface section 13.

Here, the control section 11 is a program control device such as a CPU (Central Processing Unit) and executes a program which is stored in the storage section 12. In the present embodiment, the control section 11 acquires information regarding a line-of-sight direction of a user who wears the display apparatus 2 and determines a field of view of the user in a virtual three-dimensional space in either a first mode of determining the field of view of the user in the virtual three-dimensional space in accordance with the acquired information regarding the line-of-sight direction of the user, or a second mode of determining the field of view of the user in the virtual three-dimensional space at least without using the information regarding the line-of-sight direction in a predetermined direction among the acquired information regarding the line-of-sight direction of the user. The control section 11 generates an image of an object in the virtual three dimensional space in the determined field-of-view, outputs a signal related to the generated image to the display apparatus 2, and causes the generated image to be displayed on the display apparatus 2. Details of the operation in the control section 11 will be described later.

The storage section 12 includes at least one of memory devices such as a RAM (Random Access Memory) and stores a program executed by the control section 11. Also, the storage section 12 operates as a working memory of the control section 11 and stores data to be used by the control section 11 in the course of executing the program. This program may be provided being stored in a computer-readable and non-transitory storage medium, and then stored in the storage section 12.

The interface section 13 is an interface through which the control section 11 of the information processing apparatus 1 performs data communication with the operation device 3 and the display apparatus 2. The information processing apparatus 1 is connected with the operation device 3, the display apparatus 2, and the like in a wired or wireless manner through the interface section 13. By way of example, the interface section 13 may include a multimedia interface such as HDMI (registered trademark) (High-Definition Multimedia Interface) in order to transmit image data or audio which are supplied by the information processing apparatus 1 to the display apparatus 2. In addition, the interface section 13 may include a data communication interface such as a USB (Universal Serial Bus) in order to receive various types of information and transmit a control signal or the like to and from the display apparatus 2. Further, the interface section 13 may include a data communication interface such as a USB in order to receive a signal indicating contents of operational input of the user to the operation device 3.

The display apparatus 2 is a display device to be used by the user wearing the display apparatus 2 on the head. The display apparatus 2 receives image data and audio data which are supplied by the information processing apparatus 1. Then, the display apparatus 2 generates image data in which the received image data is rearranged into a pixel array of each of display sections in a video display element 51 of the display apparatus 2, which will be described hereinafter. Further, if necessary, the display apparatus 2 executes processing or the like for correcting a distortion caused by an optical system of the display apparatus 2 on an image represented by the supplied image data and generates a video signal representing the corrected image.

Note that the video signal generated here may include two video signals, a left-eye video signal and a right-eye video signal. Further, the display apparatus 2 displays a video according to the generated video signals and allows the user to view the video. In the present embodiment, the display apparatus 2 is assumed to display videos corresponding to the respective eyes in front of the right eye and the left eye of the user. As illustrated in FIG. 1, the display apparatus 2 includes the video display element 51 and an optical element 52.

The video display element 51 is an organic EL (Electroluminescence) display panel, a liquid crystal display panel, or the like and displays a video in accordance with an instruction input from the information processing apparatus 1. The video display element 51 may be one display element that displays a left-eye video and a right-eye video arrayed in a line or may include a pair of display elements each displaying the left-eye video and the right-eye video independently. Also, in another example of the present embodiment, a display screen of a smartphone may be directly used as the video display element 51. Further, the video display element 51 may be a retina irradiation type (retina projection type) apparatus that directly projects a video on retinas of the user.

In a case in which a display screen of a smartphone may be used as the video display element 51, this smartphone receives image data and audio date which are supplied from the information processing apparatus 1. Then, the display apparatus 2 generates image data in which the received image data is rearranged into a pixel array of a display section in the video display element 51 of the display apparatus 2, which will be described hereinafter. Further, if necessary, the display apparatus 2 executes processing or the like for correcting a distortion caused by an optical system of the display apparatus 2 on an image represented by the supplied image data and generates a video signal representing the corrected image. Also, the video display element 51 may be a device which directly projects a video on the retinas of the user.

Examples of the optical element 52 include a hologram, a prism, a half mirror, or the like, and the optical element 52 is arranged in front of the user's eyes to transmit or refract video light displayed by the video display element 51 and allows the light to be incident on the user's eyes. Specifically, the optical element 52 includes a left-eye optical element 52L and a right-eye optical element 52R. In this case, the left-eye video displayed by the video display element 51 may be allowed to be incident on the user's left eye via the left-eye optical element 52L. Further, the right-eye video displayed by the video display element 51 may be allowed to be incident on the user's right-eye via the right-eye optical element 52R. Through this process, in a state in which the display apparatus 2 is worn on the head of the user, the user can view the left-eye video and the right-eye video by the left eye and the right eye, respectively. Note that, in the present embodiment, the display apparatus 2 is a non-transmission-type display apparatus incapable of visually recognizing external situations by the user.

Also, the operation device 3 is a controller for a game console, for example, and is used to perform various instruction operations to the information processing apparatus 1 by the user. Contents of the operation input of the user to the operation device 3 are transmitted to the information processing apparatus 1 in either a wired or wireless manner. Note that the operation device 3 need not necessarily be a separate member from the information processing apparatus 1 and may include an operation button, a touch panel, or the like arranged on a housing surface of the information processing apparatus 1.

Figure 2:
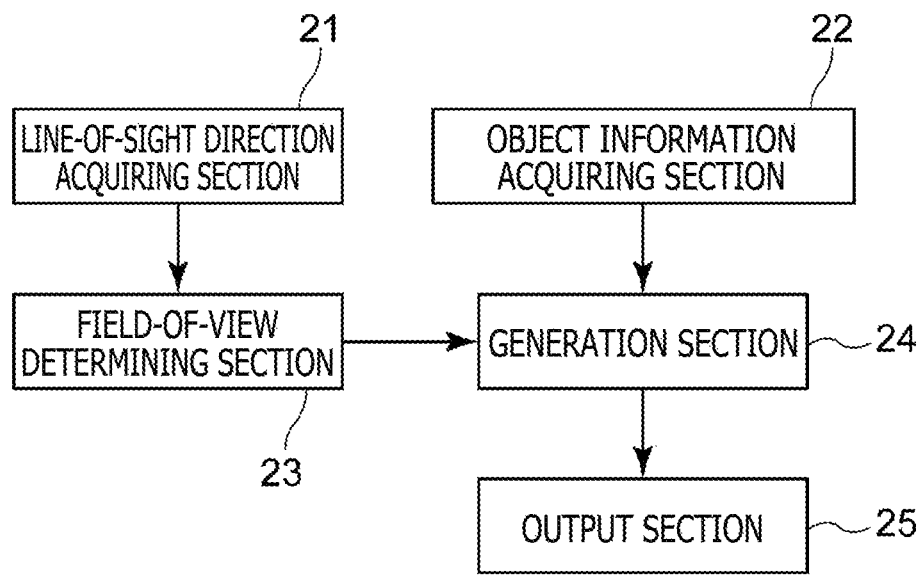
FIG. 2 is a diagram depicting a functional block diagram depicting an example of the information processing apparatus according to the embodiment of the present invention.

Next, operations of the control section 11 of the information processing apparatus 1 will be described. In the present embodiment, as depicted in FIG. 2, the control section 11 executes a program stored in the storage section 12 to thereby functionally include a line-of-sight direction acquiring section 21, an object information acquiring section 22, a field-of-view determining section 23, a generation section 24, and an output section 25.

The line-of-sight direction acquiring section 21 repeatedly acquires information regarding the line-of-sight direction of the user wearing the display apparatus 2 at a predetermined timing (at a periodical timing, for example, every 1/30 seconds). Specifically, the line-of-sight direction acquiring section 21 acquires information representing a direction of the head of the user with the direction of the head of the user serving as the line-of-sight direction. More specifically, the line-of-sight direction acquiring section 21 may acquire information regarding an orientation of the head of the user by detecting a posture of the display apparatus 2 which is worn on the user on the basis of an image of the user captured by a camera not depicted or using information etc. output from a posture sensor which is provided in the display apparatus 2. Such a method of detecting the orientation of the head of the user can adopt various well-known methods, and accordingly, detailed description thereof will be omitted herein.

Also, in the following description, the line-of-sight direction acquiring section 21 of the present embodiment is assumed to acquire the direction of the head of the user which is represented by a set of angles $(\theta, \varphi, \psi)$, with an angle of the head of the user relative to a vertical direction (elevation angle direction) set as $\theta$ (angle in a sagittal plane), an angle of the head of the user relative to a left-right direction set as $\varphi$ (angle in a transverse plane), an angle of the head of the user in a coronal plane set as $\psi$. Note that the line-of-sight direction acquiring section 21 in this example is assumed to set the direction of the head of the user (front direction to which the face of the user turns) when a predetermined activation operation to the information processing apparatus 1 is carried out, as a reference direction $(\theta, \varphi, \psi)=(0, 0, 0)$, to detect the direction of the head of the user by a change amount of an angle from the reference direction to each direction.

The object information acquiring section 22 acquires information regarding a virtual object to be displayed in a virtual space. Specifically, the information regarding a virtual object acquired by the object information acquiring section 22 is provided from a side of an application program such as a game application and includes information regarding a shape and texture of the object, a position and an orientation in which the object is disposed, and the like. These pieces of information regarding a virtual object and acquisition processing thereof are widely known, and accordingly, a detailed description thereof will be omitted herein.

The field-of-view determining section 23 determines a direction of a field of view of the user and an angle of view of the user in the virtual space. The field-of-view determining section 23 in the present embodiment determines the direction of the field of view of the user in the virtual space in the following manner. When the user carries out a predetermined calibration operation (or at a time of starting the calibration operation processing), the field-of-view determining section 23 in the present embodiment uses the information $(\theta, \varphi, \psi)$ representing a direction of the head of the user in a real space at that point of time to set the angle of the face of the user relative to the elevation angle direction (the angle in the sagittal plane) in the virtual space as $\alpha 0=\theta$, the angle of the face of the user relative to the left-right direction (the angle in the transverse plane) in the virtual space as $\beta 0=\varphi$, and the angle of the face of the user relative to a plane of the field-of-view direction (the angle in the coronal plane) in the virtual space as $\gamma 0=\psi$.

Also, the field-of-view determining section 23 checks whether or not the user carries out a predetermined gazing operation. The gazing operation herein may include an operation of pressing a predetermined button of the operation device 3, for example. In this case, the field-of-view determining section 23 decides that the predetermined gazing operation is carried out while the predetermined button is being pressed, and when a state in which the predetermined button is pressed changes to a state in which the predetermined button is not pressed, the field-of-view determining section 23 that decides the gazing operation ends.

Then, when the user does not carry out the predetermined gazing operation, the field-of-view determining section 23 sets the direction of the head of the user $(\alpha, \beta, \gamma)$ in the virtual space to $\alpha=\theta-\alpha 0$, $\beta=\varphi-\beta 0$, and $\gamma=\psi-\gamma 0$. Note that the angle of the face of the user relative to the elevation angle direction in the virtual space (the angle in the sagittal plane) is represented as $\alpha$, the angle of the face of the user relative to the left-right direction in the virtual space (the angle in the transverse plane) as $\beta$, the angle of the face of the user relative to a plane of the field-of-view direction in the virtual space (the angle in the coronal plane) as $\gamma$ in this case.

Meanwhile, the field-of-view determining section 23 does not cause the direction of the head of the user in the virtual space $(\alpha, \beta, \gamma)$ to be changed while the user carries out the gazing operation.

Note that, at a point in time when the user ends the predetermined gazing operation, the field-of-view determining section 23 assumes that the calibration operation has been carried out and by use of the information $(\theta, \varphi, \psi)$ of the head of the user in the real space at this point, may set the angle of the face of the user relative to the elevation angle direction in the virtual space (the angle in the sagittal plane) as $\alpha 0=\theta$, the angle of the face of the user relative to the left-right direction in the virtual space (the angle in the transverse plane) as $\beta 0=\varphi$, the angle of the face of the user relative to a plane of the field-of-view direction in the virtual space (the angle in the coronal plane) as $\gamma 0=\psi$.

The generation section 24 renders the image in the virtual space which is projected in the field of view of the user determined by the field-of-view determining section 23 to generate an image of the object in the field of view. This process is general processing of three-dimensional graphics, so that a detailed description thereof is omitted herein. The output section 25 outputs the image of the object generated by the generation section 24 to the display apparatus 2.

[Operation] The present embodiment basically includes the above-described configurations and operates in the following manner. The information processing apparatus 1 in the present embodiment is connected with the display apparatus 2 which is worn on the head of the user and with the operation device 3 operated by the user.

Figure 3:
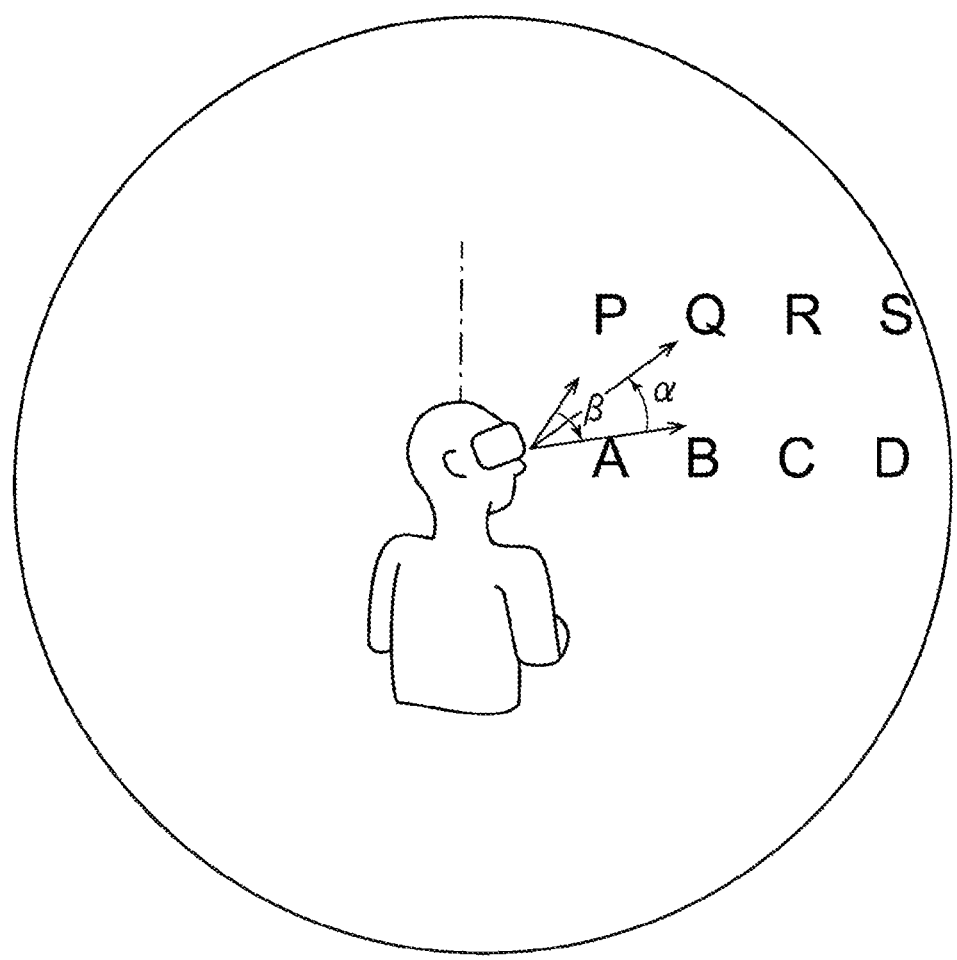
FIG. 3 is an explanatory diagram depicting an example of a virtual space processed by the information processing apparatus according to the embodiment of the present invention.

The information processing apparatus 1 executes a process of arranging the object in a virtual game space (virtual space) in a process of a game application or the like for display. In the following description, as illustrated in FIG. 3, a case in which an inner surface of a spherical shaped object with the position of the user as a center is pasted with texture of a 360-degree image is used for explanation as an example. However, the present embodiment is not limited to this example.

The information processing apparatus 1 acquires the information regarding an initial orientation of the head of the user at a point in time when the user wears the display apparatus 2 and turns the power on and initializes the orientation of the head of the user, assuming that the acquired information indicates the reference direction represented by $(\theta, \varphi, \psi)=(0, 0, 0)$. Note that the angle of the face of the user relative to the elevation angle direction (the angle in the sagittal plane) is represented as $\theta$, the angle of the face of the user relative to the left-right direction (the angle in the transverse plane) as $\varphi$, the angle of the face of the user in the coronal plane as $\psi$, in this case.

Also, by use of the information $(\theta, \varphi, \psi)=(0, 0, 0)$ of the head of the user in the real space at this point, the information processing apparatus 1 sets the angle of the face of the user relative to the elevation angle direction (the angle in the sagittal plane) in the virtual space as $\alpha 0=\theta=0$, the angle of the face of the user relative to the left-right direction (the angle in the transverse plane) in the virtual space as $\beta 0=\varphi=0$, the angle of the face of the user relative to a plane of the field-of-view direction (the angle in the coronal plane) in the virtual space as $\gamma 0=\psi=0$. Note that the angle of the face of the user relative to the elevation angle direction in the virtual space (the angle in the sagittal plane) is represented as $\alpha$, the angle of the face of the user relative to the left-right direction (the angle in the transverse plane) in the virtual space as $\beta$, the angle of the face of the user relative to a plane of the field-of-view direction (the angle in the coronal plane) in the virtual space as $\gamma$, in this case.

Figure 4:
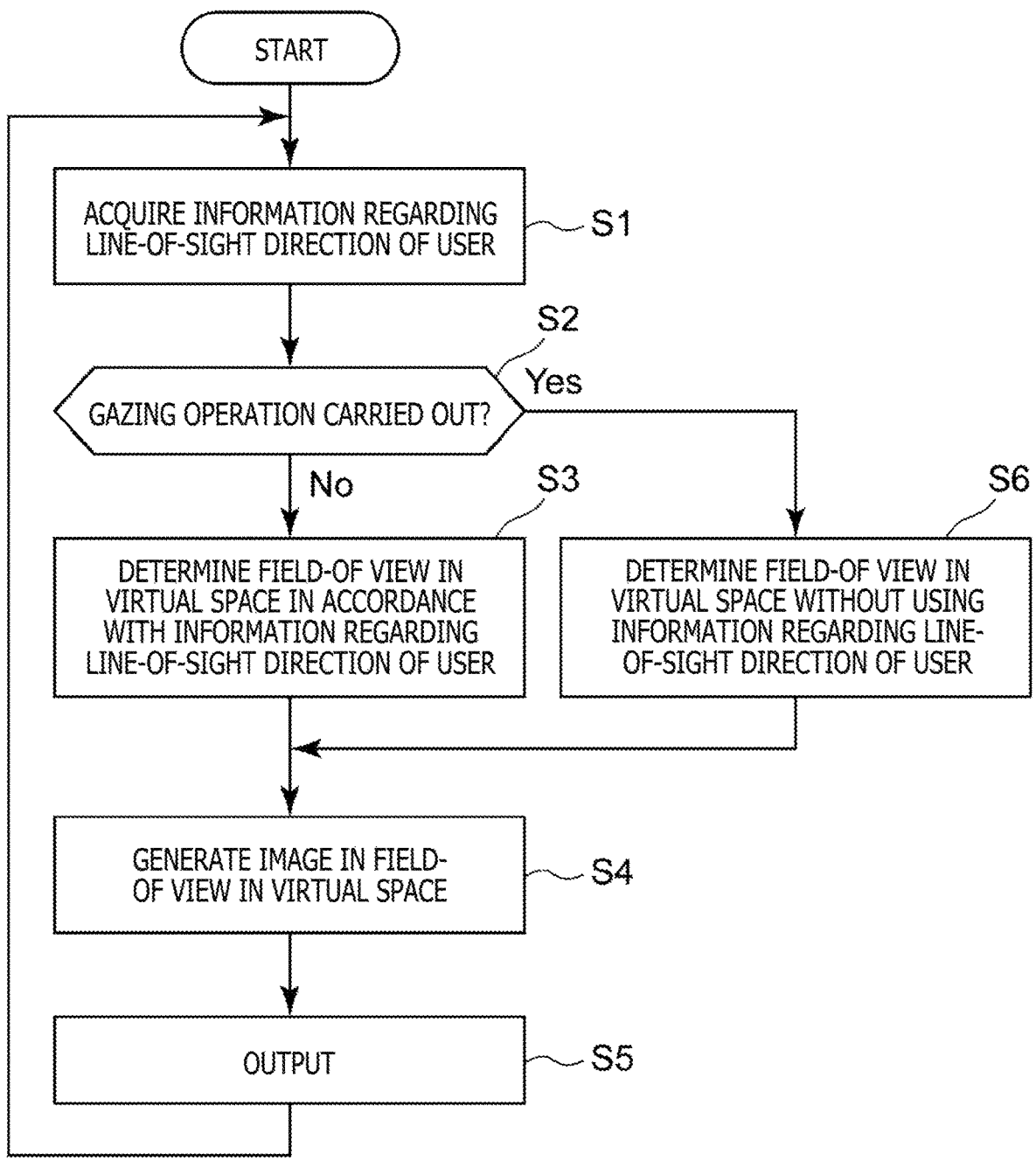
FIG. 4 is a flowchart indicating an example of operation of the information processing apparatus according to the embodiment of the present invention.

Hereinafter, the information processing apparatus 1 executes the processing illustrated in FIG. 4 and repetitively acquires information regarding the line-of-sight direction of the user at each predetermined timing (S1). Subsequently, the information processing apparatus 1 checks whether or not the user carries out a predetermined gazing operation (S2). In this case, it is assumed that the gazing operation is in a state in which a predetermined button of the operation device 3 is pressed.

When the user does not carry out the predetermined gazing operation (process S2: No), the information processing apparatus 1 sets the direction of the head of the user in the virtual space $(\alpha, \beta, \gamma)$ to $\alpha=\theta-\alpha 0$, $\beta=\varphi-\beta 0$, and $\gamma=\psi-\gamma 0$ (S3). Then, the information processing apparatus 1 renders an image in the virtual space which is projected in the field of view of the user set in the process S3 and generates an image of an object in the field of view (S4). The information processing apparatus 1 outputs the image of the object generated in the process S4 to the display apparatus 2 (S5), and returns to the process S1 and continues to execute the processing.

Figure 5:
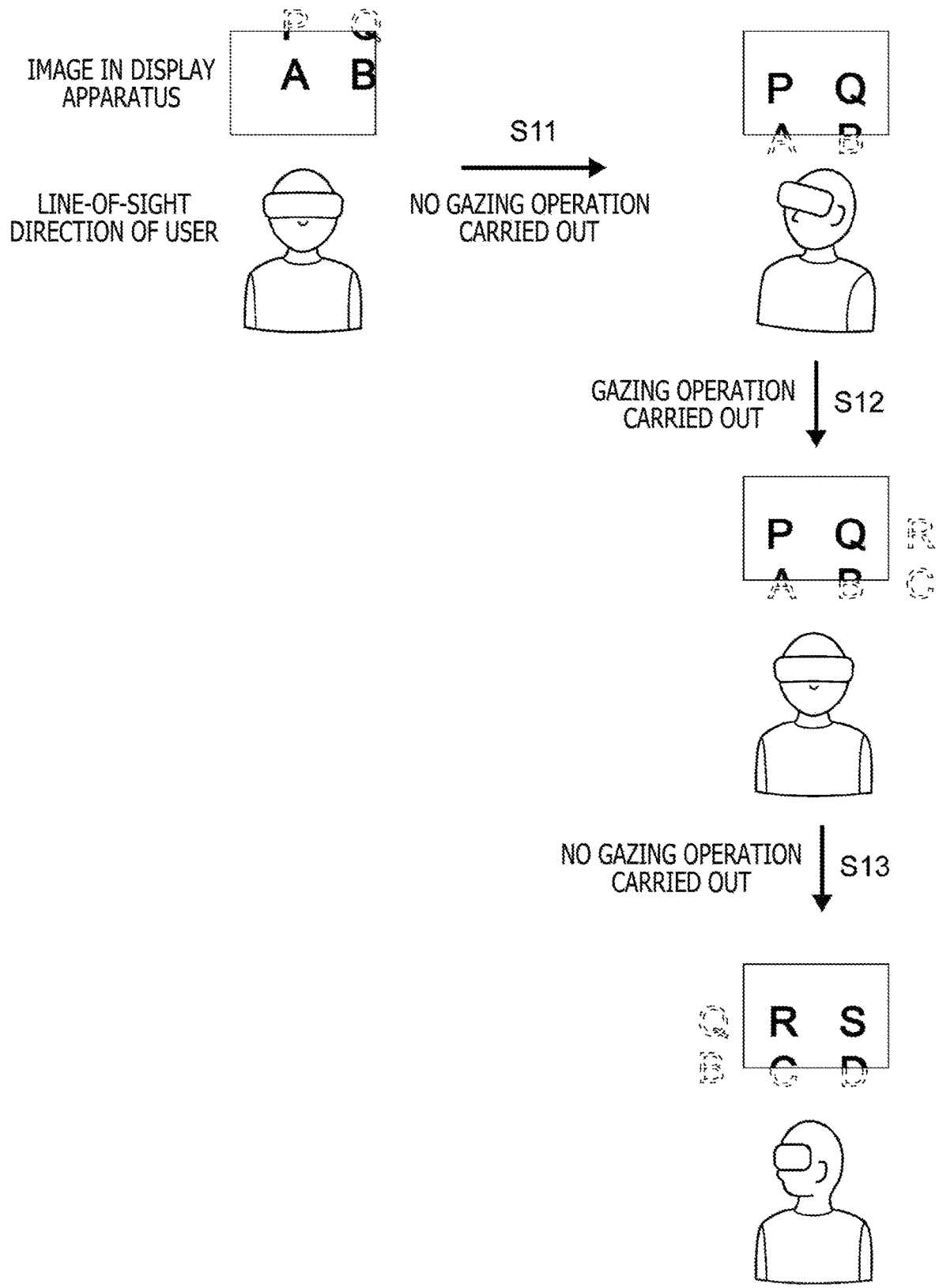
FIG. 5 is an explanatory diagram depicting an exemplary relation between a line-of-sight direction of a user detected by the information processing apparatus according to the embodiment of the present invention and an image to be generated.

In this case (the case in which the user does not carry out the predetermined gazing operation), for example, when the user turns the head to an upper right side ($\theta$ and $\gamma$ increase, while $\psi$ keeps substantially the same value as the initial value), the display apparatus 2 displays images to be present on the upper right side relative to the display range prior to the turning of the head on the upper right side (FIG. 5: S11). This operation corresponds to a first mode of the present invention. Note that, in FIG. 5, image portions which may be displayed when the field of view of the user is changed are illustrated with broken lines for explanation, while the broken lines are not actually displayed.

Meanwhile, when it is decided in the process S2 that the user carries out the predetermined gazing operation (process S2: Yes), the information processing apparatus 1 does not change the direction of the head of the user in the virtual space $(\alpha, \beta, \gamma)$ irrespective of change in direction of the head of the user in the real space (S6), and the processing moves to the process S4 and continues.

In this case (the case in which the user carries out the predetermined gazing operation), even when the user turns the head to the right upper side (even when $\theta$ and $\varphi$ increase, while w keeps substantially the same value as the initial value), for example, the display apparatus 2 has continuously displayed the image in the display range prior to the turning of the head to the right upper side (FIG. 5: S12). In other words, in the process S6, the virtual field of view is determined in any one of the directions (each direction of ($\theta$, $\varphi$, $\psi$)), irrespective of the acquired information regarding the direction of the head (acquired information regarding the line-of-sight direction). This operation corresponds to a second mode of the present invention.

Accordingly, for example, in a state in which the user views display on the display apparatus 2, when the user inclines the direction of the head so as to view the right upper side of the display, the information processing apparatus 1 updates contents of the image being displayed on the display apparatus 2 in response to the motion of the user (FIG. 5: S11). In this case, the user carries out the predetermined gazing operation through operation of the operation device 3 and returns the position of the head to a state before the head is inclined so as to view the right upper side in a state in which the predetermined gazing operation is being carried out (returns to the reference direction of ($\theta$, $\varphi$, $\psi$)=(0, 0, 0)). Then, since the information processing apparatus 1 does not change the direction of the head of the user in the virtual space ($\alpha$, $\beta$, $\gamma$) irrespective of change in direction of the head of the user in the real space while doing this, the image which has been updated earlier remains to be displayed (the line of sight becomes fixed in the right upper direction. FIG. 5: S12).

When the user terminates the predetermined gazing operation on the operation device 3 here, in response to change in direction of the head of the user, the direction of the head of the user in the virtual space ($\alpha$, $\beta$, $\gamma$) is changed, and display is controlled such that an image in a direction corresponding to a direction of the head of the user is displayed hereinafter (FIG. 5: S13).

[Example in which an axis to be changed is limited] Note that, in the above description, it is assumed that the information processing apparatus 1 does not change the information regarding all the angle components representing the direction of the head of the user in the virtual space (α, β, γ) irrespective of change in direction of the head of the user in the real space in the second mode operation, that is, in the operation when it is decided that the user carries out the predetermined gazing operation. However, the present embodiment is not limited to this.

Specifically, in an example of the present embodiment, the information regarding the angle components representing the direction of the head of the user in the virtual space (α, β, γ) may be determined irrespective of the information regarding the orientation of the head at least in a predetermined direction (line-of-sight direction), of the horizontal or vertical (elevation angle) direction and the direction in which the head of the user is inclined, among the acquired information regarding the direction of the head of the user (regarding the line-of-sight direction).

In particular, in the second mode operation, that is, in the operation when it is decided that the user carries out the predetermined gazing operation, the information processing apparatus 1 according to one example of the present embodiment may not change only the information regarding the angle β corresponding to the angle of the head of the user in the horizontal direction, for example, in one of the horizontal or vertical (elevation angle) direction, and may reset such that the angle γ corresponding to the inclination of the head of the user and the angle α corresponding to the angle in the other of the horizontal or vertical (elevation angle) direction, that is, the angle α corresponding to the angle in the vertical (elevation angle) direction in the former example, are changed so as to satisfy the relations α=θ−α0 and γ=ψ−γ0 even when the user carries out the predetermined gazing operation.

Figure 6:
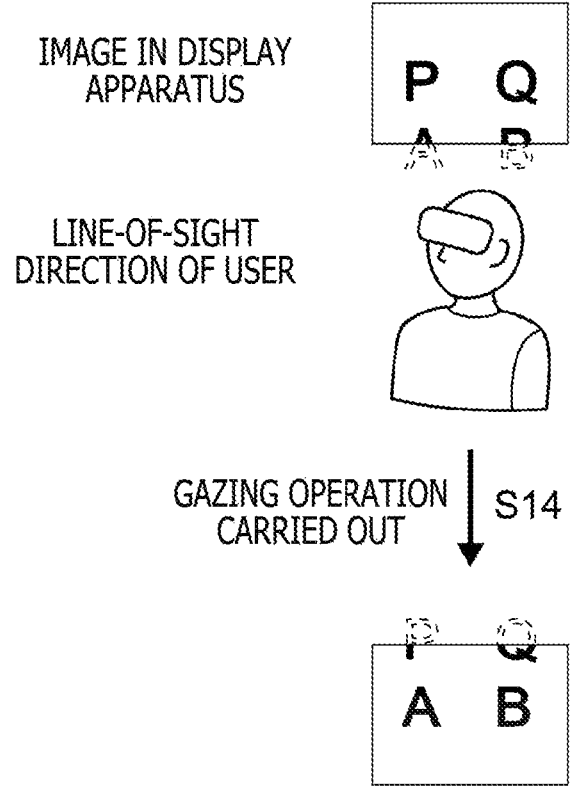
FIG. 6 is an explanatory diagram depicting another exemplary relation between a line-of-sight direction of a user detected by the information processing apparatus according to the embodiment of the present invention and an image to be generated.

In this example, after the step S11 in FIG. 5, the user operates the operation device 3 to carry out the predetermined gazing operation, and in a state in which the predetermined gazing operation is being carried out, the position of the head of the user returns to the state before the head is inclined (returns to the reference direction (θ, φ, ψ)=(0, 0, 0)) such that the user views the right upper side. Then, the information processing apparatus 1 uses at least the information related to the vertical direction without using the information related to the horizontal direction (specifically, without changing the angle β) in response to change in direction of the head of the user in the real space to set the angles α and γ so as to satisfy α=0 and γ=0. Accordingly, as illustrated in FIG. 6, the image on the display apparatus 2 returns to the initial position in the vertical direction and remains to be fixed in the horizontal direction at the position of the image when viewing the right upper side (S14).

Moreover, in this case, it is configured such that, irrespective of the direction of the head of the user in the real space only in the horizontal direction, the information regarding all the angle components representing the direction of the head of the user in the virtual space (α, β, γ) are set; however, the present embodiment is not limited to this.

For example, the information processing apparatus 1 acquires the information representing the direction of the head of the user in the real space (θ, φ, ψ) at each predetermined timing, and obtains a difference (Δθ, Δφ, Δψ) between the information (θ, φ, ψ) and the information representing the direction of the head of the user in the real space which has been previously acquired. Then, when the relation Δθ>Δφ is satisfied, even if the angle φ changes, the information processing apparatus 1 does not change the angle (β) in the horizontal direction of the head of the user in the virtual space while resetting only the angles (α) and γ such that the relations α=θ−α0 and γ=ψ−γ0 are satisfied. Conversely, when the relation Δθ<Δφ is satisfied, even if the angle θ changes, the information processing apparatus 1 does not change the angle α in the vertical (elevation angle) direction of the head of the user in the virtual space while resetting only the angles β and γ such that the relations β=φ−β0 and γ=ψ−γ0 are satisfied, for example. Thus, the axis direction in the virtual space not to be changed may be dynamically determined.

In addition, in another example, while the user presses a predetermined first button of the operation device 3 through operation of the user, the information processing apparatus 1 does not change only the angle (β) in the horizontal direction among the information regarding the angle components (α, β, γ) representing the direction of the head of the user in the virtual space, irrespective of change in direction of the head of the user in the real space, and rests only the angles α and γ such that the relations α=θ−α0 and γ=ψ−γ0 are satisfied by using the information (θ, φ, ψ) representing the direction of the head of the user in the real space. While the user presses a predetermined second button which is different from the first button described above, the information processing apparatus 1 does not change the angle (α) in the vertical (elevation angle) direction of the head of the user in the virtual space, among the information regarding the angle components (α, β, γ) representing the direction of the head of the user in the virtual space, and resets the angles β and γ such that the relations β=β0 and γ=ψ−γ0 are satisfied, for example. Thus, the axis direction in the virtual space not to be changed may be determined through the operation of the user.

[Another Example of Detection of Line-of-Sight Direction] In the foregoing description of the present embodiment described so far, it has been assumed that the information processing apparatus 1 detects the line-of-sight direction according to the direction of the head of the user; however, the present embodiment is not limited to this. For example, the information processing apparatus 1 may detect the direction of the actual line of sight of the user (direction of the pupils) in the display apparatus 2. In this example, it is assumed that the display apparatus 2 detects the direction of the pupils of the right and left eyes of the user to output information (information regarding a gazing position) indicating which portion of an image displayed on the video display element 51 is viewed by the user, for example. The information processing apparatus 1 receives the information regarding this gazing position (instead of the above mentioned information θ, φ, and ψ) as information regarding the line-of-sight direction of the user.

Figure 7:
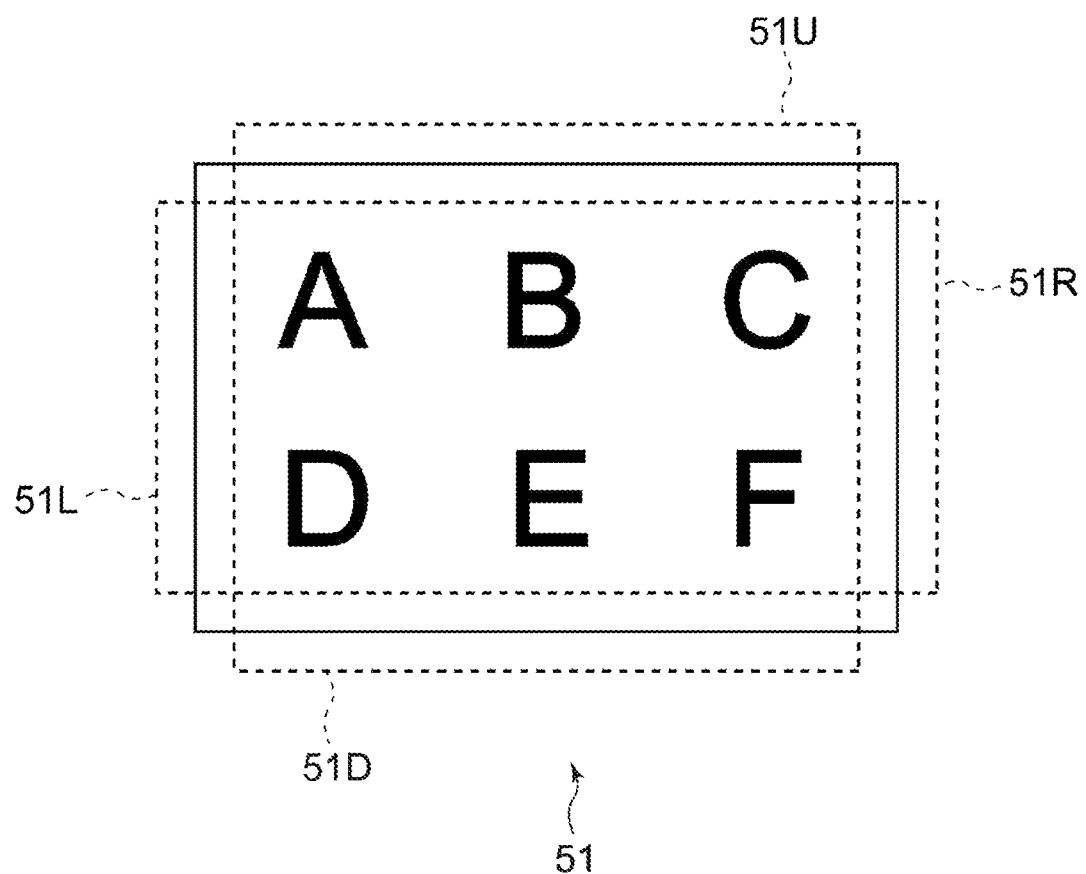
FIG. 7 is an explanatory diagram depicting an example of a line-of-sight direction of a user detected by the information processing apparatus according to the embodiment of the present invention.

In this example, the information processing apparatus 1 may decide whether or not a predetermined gazing operation is carried out according to whether or not the received information regarding the line-of-sight direction of the user satisfies a preset condition. By way of example, as illustrated in FIG. 7, when the gazing position of the user is included in a predetermined peripheral edge portion of the field of view, the information processing apparatus 1 may decide that the predetermined gazing operation is carried out. Herein, the field of view is set by the information processing apparatus 1 and is an range of an image which is displayed in the display apparatus 2 with objects within the field of view rendered, and its peripheral edge portion is a peripheral edge portion of the video display element 51.

Specifically, the information processing apparatus 1 decides whether or not the gazing position of the user is in any of an upper edge portion (51U), a lower edge portion (51D), a left edge portion (51L), and a right edge portion (51R) of the video display element 51. Alternatively, the information processing apparatus 1 measures a period of time for which a state in which the gazing position of the user is included in any of the upper edge portion (51U), the lower edge portion (51D), the left edge portion (51L), and the right edge portion (51R) which are the peripheral edge portion of the video display element 51 continues and may decide whether or not the period of time exceeds a preset time threshold value.

When the information processing apparatus 1 decides that the gazing position of the user is not in the peripheral edge portion of the video display element 51 (or the period of time at which the gazing position of the user is in the peripheral edge portion thereof does not exceed the time threshold value), the information processing apparatus 1 does not change the direction of the head of the user in the virtual space ($\alpha$, $\beta$, $\gamma$) (does not change the contents to be displayed on the display apparatus 2) irrespective of change in line-of-sight direction of the user (change in gazing position).

In contrast, when the information processing apparatus 1 decides that the gazing position of the user is in the peripheral edge portion of the video display element 51 (or the period of time for which the gazing position of the user is in the peripheral edge portion thereof exceeds the time threshold value), the information processing apparatus 1 checks whether the gazing position of the user is in any of the upper edge portion (51U), the lower edge portion (51D), the left edge portion (51L), and the right edge portion (51R), and when the gazing position of the user is in the upper edge portion (51U), the information processing apparatus 1 adds a preset value (which may be set from a game application or the like) to the angle $\alpha$ in the elevation angle direction of the direction of the head of the user in the virtual space and updates the angle $\alpha$ representing the direction of the head of the user in the virtual space.

Moreover, when the gazing position of the user is in the lower edge portion (51D), the information processing apparatus 1 subtracts a preset value (which may be set from a game application or the like) from the angle $\alpha$ in the elevation angle direction of the direction of the head of the user in the virtual space and updates the angle $\alpha$ representing the direction of the head of the user in the virtual space.

Further, when the gazing position is in the left edge portion (51L), the information processing apparatus 1 subtracts a preset value (which may be set from a game application or the like) from the angle $\beta$ in the horizontal direction of the direction of the head of the user in the virtual space and updates the angle $\beta$ representing the direction of the head of the user in the virtual space.

In addition, when the gazing position is in the right edge portion (51R), the information processing apparatus 1 adds a preset value (which may be set from a game application or the like) to the angle $\beta$ in the horizontal direction among the direction of the head of the user in the virtual space and updates the angle $\beta$ representing the direction of the head of the user in the virtual space.

When the user turns the eyes to the right end of the video display element 51 (or the user continues to look at the right end thereof only for a period of time longer than a predetermined time threshold value), for example, the information processing apparatus 1 in this example controls so as to display an image in the virtual space when the head of the user turns to the right side in the virtual space (the first mode operation of the present invention). Also, the information processing apparatus 1 in this example controls so as not to change an image displayed on the display apparatus 2 even if the user moves the line of sight while the user is viewing a range other than the peripheral edge portion of the video display element 51 (the second operation mode of the present invention).

Note that, in this example, the information processing apparatus 1 may determine whether an image to be displayed is controlled in either the first mode or the second mode according to not only a condition related to the gazing direction of the user but also a condition combining the condition related to the gazing direction of the user and an operation of the user on the operation device 3.

For example, in the example described above, when it is decided that the gazing position of the user is not in the peripheral edge portion of the video display element 51 (or the period of time for which the gazing position of the user is in the peripheral edge portion thereof does not exceed the predetermined time threshold value), or a predetermined operation is not carried out (for example, the predetermined button of the operation device 3 is not pressed), the information processing apparatus 1 does not change the direction of the head of the user in the virtual space ($\alpha$, $\beta$, $\gamma$) (does not change the contents to be displayed on the display apparatus 2) irrespective of change in line-of-sight direction of the user (change in gazing operation).

In contrast, when it is decided that the gazing position of the user is in the peripheral edge portion of the video display element 51 and a predetermined operation is carried out (for example, the predetermined button of the operation device 3 is pressed), the information processing apparatus 1 checks whether the gazing position thereof is in any of the upper edge portion (51U), the lower edge portion (51D), the left edge portion (51L), and the right edge portion (51R) (or measures a period of time for which the gazing position thereof is in any of the upper edge portion (51U), the lower edge portion (51D), the left edge portion (51L), and the right edge portion (51R) and checks whether the period of time measured here exceeds the preset time threshold value). When the gazing position is in the upper edge portion (51U) (or the period of time for which the gazing position is in the upper edge portion exceeds the time threshold value) and the predetermined operation is carried out, the information processing apparatus 1 adds the preset value (which may be set from a game application or the like) to the angle $\alpha$ in the elevation angle direction of the direction of the head of the user in the virtual space and updates the angle $\alpha$ representing the direction of the head of the user in the virtual space.

In addition, when the gazing position is in the lower edge portion (51D) (or the period of time for which the gazing position is in the lower edge portion exceeds the time threshold value) and the predetermined operation is carried out, the information processing apparatus 1 subtracts the preset value (which may be set from a game application or the like) from the angle $\alpha$ in the elevation angle direction of the direction of the head of the user in the virtual space and updates the angle $\alpha$ representing the direction of the head of the user in the virtual space.

Further, when the gazing position is in the left edge portion (51L) (or the period of time for which the gazing position is in the left edge portion exceeds the time threshold value) and the predetermined operation is carried out, the information processing apparatus 1 subtracts the preset value (which may be set from a game application or the like) from the angle $\beta$ in the horizontal direction of the direction of the head of the user in the virtual space and updates the angle $\beta$ representing the direction of the head of the user in the virtual space.

In addition, when the gazing position is in the right edge portion (51R) (or the period of time for which the gazing position is in the right edge portion exceeds the time threshold value) and the predetermined operation is carried out, the information processing apparatus 1 adds the preset value (which may be set from a game application or the like) to the angle β in the horizontal direction of the direction of the head of the user in the virtual space and updates the angle β representing the direction of the head of the user in the virtual space.

[Further Example of Detection in Line-Of-Sight Direction] Further, the information processing apparatus 1 may not only detect a posture of the display apparatus 2 but also acquire information regarding the direction of the head of the user by detecting the direction of a cervical joint part (orientation of the neck) of the user, even in a case in which the line-of-sight direction is detected according to the direction of the head of the user.

[Effect of Embodiment] According to the information processing apparatus 1 of the present embodiment, when the user does not carry out the gazing operation and when the user gazes a predetermined range of an image, as with a conventional technique, the field of view is smoothly altered, and when the user carries out the gazing operation or the user gazes a range other than the predetermined range of the image described above, the field of view is fixed. In this manner, in the present embodiment, movement of the field of view is not made in a discontinuous manner, and accordingly, a sense of reality is not impaired. Moreover, operation of the user or the like enables movement of the line of sight with the field of view fixed, thereby achieving reduction of sickness.

REFERENCE SIGNS LIST

1 Information processing apparatus, 2 Display apparatus, 3 Operation device, 11 Control section, 12 Storage section, 13 Interface section, 21 Line-of-sight direction acquiring section, 22 Object information acquiring section, 23 Field-of-view determining section, 24 Generation section, 25 Output section, 51 Video display element, 52 Optical element.

The invention claimed is:

1. An information processing apparatus connected to a display apparatus mounted on a head of a user, comprising:
   a first acquiring circuit configured to acquire information regarding a line-of-sight direction of the user;
   a second acquiring circuit configured to acquire information related to an object in a virtual three-dimensional space;
   a field-of-view determining circuit configured to determine a field of view of the user in the virtual three-dimensional space in either a first mode in which the field of view of the user in the virtual three-dimensional space is determined in accordance with the acquired information regarding the line-of-sight direction or a second mode in which the field of view of the user in the virtual three-dimensional space is determined without using the information regarding the line-of-sight direction at least in a predetermined direction among the acquired information regarding the line-of-sight direction; and
   a generating circuit configured to generate an image of the object in the determined field of view,
   wherein the field-of-view determining circuit selects either the first mode or the second mode to determine a field of view of the user in the virtual three-dimensional space according to whether or not the acquired information regarding the line-of-sight direction of the user satisfies a preset condition, and
   wherein the generated image is output to display on the display apparatus.

2. The information processing apparatus according to claim 1, wherein the field-of-view determining circuit determines a field of view of the user in the virtual three-dimensional space in either a first mode in which the field of view of the user in the virtual three-dimensional space is determined in accordance with the acquired information regarding the line-of-sight direction or a second mode in which the field of view of the user in the virtual three-dimensional space is determined without using the information related to one of a horizontal direction or a vertical direction among the acquired information regarding the line-of-sight direction and by using the information related to the other of the horizontal direction or the vertical direction among the acquired information regarding the line-of-sight direction.

3. The information processing apparatus according to claim 1, wherein the first acquiring circuit detects a direction of the head of the user to acquire information regarding a line-of-sight direction of the user.

4. The information processing apparatus according to claim 1, wherein the field-of-view determining circuit switches the first mode and the second mode when the user carries out a predetermined operation, the modes determining a field of view of the user in the virtual three-dimensional space.

5. The information processing apparatus according to claim 1, wherein the field-of-view determining circuit switches the first mode and the second mode to determine a field of view of the user in the virtual three-dimensional space when the acquired information regarding the line-of-sight direction of the user satisfies a preset condition and the user carries out a predetermined operation.

6. The information processing apparatus according to claim 1, wherein at least one of:
   the preset condition is a condition in which the line-of-sight direction of the user is included in a predetermined peripheral edge portion of the determined field of view, and
   a condition in which a duration time for which the line-of-sight direction of the user is included in a predetermined peripheral edge portion of the determined field of view exceeds a preset threshold value.

7. An information processing method by using a computer connected to a display apparatus mounted on a head of a user, the method comprising:
   acquiring information regarding a line-of-sight direction of the user;
   acquiring information related to an object in a virtual three-dimensional space;
   determining a field of view of the user in the virtual three-dimensional space in either a first mode in which the field of view of the user in the virtual three-dimensional space is determined in accordance with the acquired information regarding the line-of-sight direction or a second mode in which the field of view of the user in the virtual three-dimensional space is determined without using the acquired information regarding the line-of-sight direction at least in a predetermined direction among the acquired information regarding the line-of-sight direction; and
   generating an image of the object in the determined field of view, wherein the determining includes selecting either the first mode or the second mode to determine a field of view of the user in the virtual three-dimensional space according to whether or not the acquired information regarding the line-of-sight direction of the user satisfies a preset condition, and wherein the generated image is output to display on the display apparatus.

8. A non-transitory, computer readable storage medium containing a computer program, which when executed by a computer connected to a display apparatus mounted on a head of a user, causes the computer to carry out actions, comprising:

acquiring information regarding a line-of-sight direction of the user;

acquiring information related to an object in a virtual three-dimensional space;

determining a field of view of the user in the virtual three-dimensional space in either a first mode in which the field of view of the user in the virtual three-dimensional space is determined in accordance with the acquired information regarding the line-of-sight direction or a second mode in which the field of view of the user in the virtual three-dimensional space is determined without using the acquired information regarding the line-of-sight direction at least in a predetermined direction among the acquired information regarding the line-of-sight direction;

generating an image of the object in the determined field of view; and, wherein the determining includes selecting either the first mode or the second mode to determine a field of view of the user in the virtual three-dimensional space according to whether or not the acquired information regarding the line-of-sight direction of the user satisfies a preset condition, and outputting a generated image to display on the display apparatus.

* * * * *